March 7, 1950            L. SPIESS            2,499,690
FOOD WARMING DEVICE
Filed Oct. 15, 1946
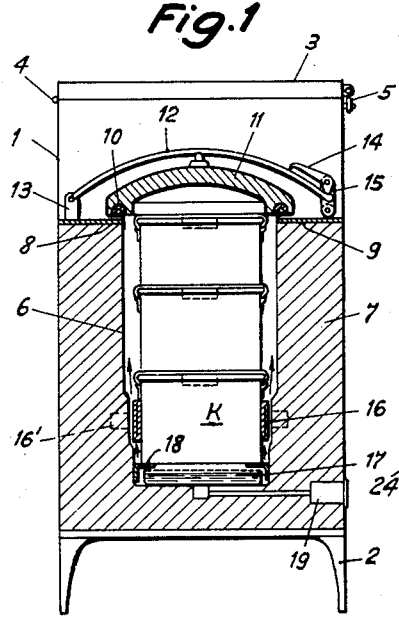
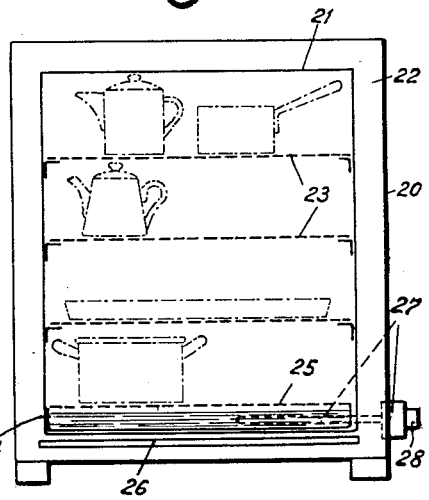
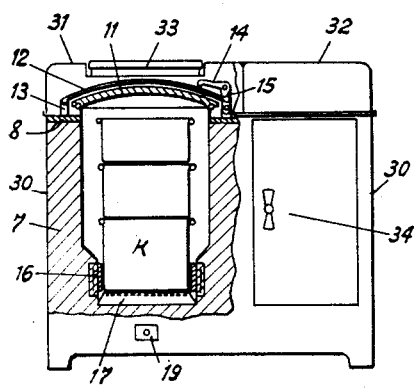
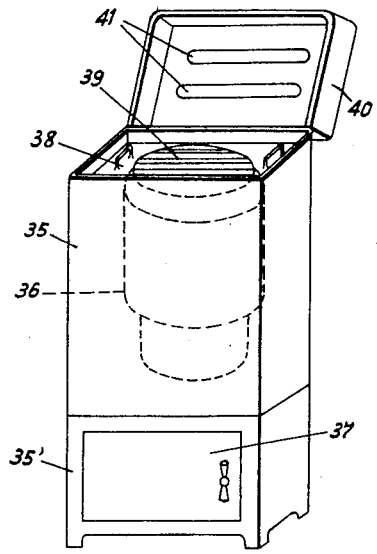
INVENTOR:
Lydia Spiess,
By Bryant & Lowry
attys.

Patented Mar. 7, 1950

2,499,690

UNITED STATES PATENT OFFICE 2,499,690

FOOD-WARMING DEVICE

Lydia Spiess, Zurich, Switzerland

Application October 15, 1946, Serial No. 703,449
In Switzerland October 15, 1945

1 Claim. (Cl. 219—35)

The present invention relates to a food-warming device comprising a hermetically sealed heat-insulated box designed to hold cooking utensils, in which the aperture for introducing and removing the cooking utensils can be hermetically closed and an electric heater is installed.

When used as a self-cooker, this device presents the advantage that food can be cooked more quickly with a comparatively low heat consumption. As a food-warming device in general it offers the advantage that with a very small heat supply food can be warmed or kept warm as long as desired by virtue of the insulation and hermetical sealing of the box.

The distribution of heat and its transfer to the cooking vessels introduced into the box can be considerably improved by arranging in the warming chamber a container filled with water which evaporates under the effect of the heat applied, thus transferring the heat by way of the steam produced to the cooking vessels.

It is of advantage to install a thermostat in the warming device for the purpose of regulating the heat supply.

The drawing shows the following constructional examples of the invention:

Fig. 1 is a cross-section of a food-warming device designed as a self-cooker,

Fig. 2 a food-warming device designed as a self-cooker for hotel use,

Fig. 3 is a front view of a food-warming device designed as a self-cooker combined with other uses, shown partly in section, Fig. 4 a perspective view of a food-warming device designed as a self-cooker and combined with other uses.

According to the first embodiment (Fig. 1) self-cooker 1 standing on feet 2 is closed with lid 3 which is articulated by means of hinge 4 and provided with lock 5. In the self-cooker heating chamber 6 is embedded in insulating mass 7. Rim 8 of heating chamber 6 lies close above plate 9 which serves to seal insulating mass 7. On rim 8 of heating chamber 6 is fixed insulating lid 11 with packing 10. 12 is a spring bow hinged at 13 whose longitudinal centre rests on lid 11 and which is pressed down at its free end by cam locking lever 14, thus pressing lid 11 against the flanged rim of the heating chamber and effecting an hermetic closure. Cam locking lever 14 pivots at the free end of guide 15 which is hinged to cover 9. In this way it is possible to swivel the locking lever outwards together with the guide after it has been unlocked, thus releasing spring bow 12. The lower part of heating chamber 6 is stepped and contains ribbon element heater 16 located at a certain distance from its walls. Supports 16' embedded in parts 6, 7 hold heater 16 which lies flush with cooking vessel K. The clear width of the lower step of heating chamber 6 is roughly adapted to the outer diameter of the lowest of the cooking vessels to be placed in the cooker so that there is a ready passage of heat to cooking vessel K. At the base of heating chamber 6 is arranged water container 17. The cooking vessels are placed one above the other and the lowest is supported a little above the water container on brackets 18. Thermostat 19 is connected to water container 17 and turns off the heater when the ceiling temperature is reached, turning it on again when the temperature drops below a fixed minimum. The thermostat can be set to any required temperature limits.

The ribbon element heater warms the lowest cooking vessel K and water-container 17 at the same time. The cooking vessels arranged above it are warmed at the same time by the rising steam (see arrows in Fig. 1), as steam is an excellent heat conductor.

As seen in Fig. 1, the inner face of the side walls of the container receiving compartment is formed stepped, thus producing a succession of zones differing from each other in horizontal cross-sectional areas, the smaller area being at the bottom of the compartment, the remaining zone or zones being of increased area. The brackets 18 are mounted in the lower zone, thus locating the lower container K as spaced from the bottom, the open-top tray or pan 17 being located in the space beneath said container. Since the ribbon-like heating means surrounds container K, practically fitting the side walls thereof, with the means carried by the compartment side walls but spaced from such walls a small distance, the heating means is made active not only within such restricted space, but, due to the contact with container K, also heats the walls of such container.

Hence, when the assemblage is in use, with the tray 17 carrying its water content and the heating means active, one initial result is that of raising the temperature of the side walls of container K and through conduction therefrom, the bottom wall of the container. Since the heating means is in direct contact with such walls the temperature of the walls of container K will be somewhat high with the temperature of the container bottom also high. This places a container face of high temperature characteristic directly over but spaced from the surface of the water content of tray 17, the radiations from which are effective on the water surface. If the temperature is sufficiently high, steam may be produced, but if not, the heat will cause material evaporation of the water surface and transform the air therebetween into moisture-laden air which, in escaping from the space must pass through the restricted space between the heating means and the compartment walls and thus be subjected to the direct heat from the heating means and assuring the development of the steam characteristic, especially since the moisture-laden air above the water surface is also subjected to the heating effect of the container bottom, thus preheating the moisture-laden air and permitting it to tend to flash into steam while passing through the restricted space and subjected to the direct heating action of the heating means. This steam can expand somewhat within the larger area zone within which the containers are located.

The second embodiment (Fig. 2) is a double-walled food-warming box with an insulating mass 22 between outer wall 20 and inner wall 21. The heating chamber is subdivided by grids 23 into four compartments intended to hold pots, pans, kettles and baking moulds of every description.

In the lowest compartment is arranged flat water tank 24 covered by perforated plate 25 which serves at the same time as grid for supporting cooking vessels. In the base of the warming box is installed electric heater 26 whose heat first passes to water container 24 and generates steam. The steam penetrates through the grids into each compartment and warms all cooking vessels rapidly and uniformly. Thermostat 27 installed in the base of the box projects into water container 24; the temperatures at which the heater is automatically switched on and off can be set as desired.

The food-warming device can also be designed without the generation of steam.

A third embodiment of the food-warming device is designed half as a cooker and half as a refrigerator. The form of the cooker is the same as in Fig. 1, for which reason the same reference numbers are used for the same parts as in Fig. 1, thus rendering a repetition of the description superfluous.

Casing 30 encloses both cooker and refrigerator and is closed at the top by means of a bipartite concave lid 31, 32. Lid-sections 31 and 32 are fitted with hinges and can be opened separately. Into section 31 is built electric hot-plate 33 which can be used for cooking when the lid is closed. Door 34 forms the access to the actual refrigerator whereas the chamber under concave lid-section 32 can also be used for keeping food cool.

The fourth embodiment is also a double-duty cooker 35 in which the actual cooker part 36 can be designed in the same manner as shown in Fig. 1. Lower section 35' of casing 35 is designed as a refrigerator accessible through door 37. Removable plate 38 with handles is let into casing 35 from above, and is equipped with electric grill 39. Access is afforded to cooker 36 by removing plate 38. Casing 35 is closed by means of lid 40 which is hinged to it. This lid is fitted with a hot-plate similar to that in Fig. 3 of which only heating elements 41 arranged underneath the plate are visible in Fig. 4.

While the form of embodiment of the invention as herein disclosed, constitutes a preferred form, it is to be understood that some changes may be made in the arrangement, construction and combination of the various parts of my invention, and it is my intention to cover by my claim such changes as may reasonably be included within the scope thereof.

I claim as my invention:

In food-warming assemblages, wherein the assemblage includes a compartment adapted to receive a plurality of containers for foods or the like in superposed relation, wherein the compartment side and bottom walls are heat insulated, and wherein a top closure for the compartment is hermetically sealed relative to the compartment, an assemblage of such type and in combination, said assemblage having the side walls of the compartment presenting an internal stepped face formation of zonal type with the zones differing dimensionally on horizontal cross-sections of the compartment and with the zone of smallest area forming the lower zone of the compartment, a succeeding zone in upward direction being of increased areal dimensions, container-supporting means carried by the zone of smallest dimensions to locate the lower container as spaced from the bottom of the compartment with such container of less areal dimensions than the similar dimensions of the zone in which it is located, a heating element means of ribbon type supported by zonal walls above such supporting means, the heating means being spaced from the zonal walls to form a restricted space therebetween, the heating means having an internal configuration to substantially fit the side exterior walls of the lower container to thereby heat the walls of such lower container, a succession of containers above the lower container, and a shallow water carrying open-top tray or pan positioned in the bottom zone of the compartment beneath the lower container with the water surface subject to the temperature conditions of the bottom of the lower container, whereby the heating means activity upon the side walls of the lower container and thereby made manifest on the container bottom by conduction from the container side walls will provide moisture-laden air by surface evaporation of the tray content with the moisture-laden air converted into steam during its passage through the restricted spacing between the heating means and step wall en route to the step zone thereabove to thereby subject the superposed containers to such steam action.

LYDIA SPIESS.

REFERENCES CITED

The following references are of record in the file of this patent:

UNITED STATES PATENTS

| Number | Name | Date |
|---|---|---|
| 890,855 | Hadaway, Jr. | June 16, 1908 |
| 1,378,566 | Shroyer | May 17, 1921 |
| 1,381,800 | Clefton | June 14, 1921 |
| 1,534,087 | Sellew et al | Apr. 21, 1925 |
| 1,983,118 | Bourque | Dec. 4, 1934 |